(12) United States Patent
Horiuchi et al.

(10) Patent No.: US 9,715,956 B2
(45) Date of Patent: Jul. 25, 2017

(54) PERMANENT MAGNET, MOTOR, AND GENERATOR

(71) Applicant: KABUSHIKI KAISHA TOSHIBA, Minato-ku, Tokyo (JP)

(72) Inventors: Yosuke Horiuchi, Tokyo (JP); Shinya Sakurada, Tokyo (JP); Masaya Hagiwara, Kanagawa (JP); Tsuyoshi Kobayashi, Kanagawa (JP); Tadahiko Kobayashi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 351 days.

(21) Appl. No.: 14/644,410

(22) Filed: Mar. 11, 2015

(65) Prior Publication Data
US 2016/0155548 A1    Jun. 2, 2016

Related U.S. Application Data

(63) Continuation of application No. PCT/JP2014/005971, filed on Nov. 28, 2014.

(51) Int. Cl.
*H01F 1/053*    (2006.01)
*C22C 19/07*    (2006.01)
(Continued)

(52) U.S. Cl.
CPC .............. *H01F 1/053* (2013.01); *C22C 19/07* (2013.01); *C22C 30/02* (2013.01); *H01F 1/0557* (2013.01);
(Continued)

(58) Field of Classification Search
CPC ........ H01F 1/053; H01F 1/0557; H01F 1/086; H01F 1/0596; H01F 1/0536; C22C 19/07; C22C 30/02; C22C 30/00; H02K 1/02
(Continued)

(56) References Cited

U.S. PATENT DOCUMENTS 3,947,295 A * 3/1976 Tawara ................. H01F 1/0557
                                                     148/101
5,137,587 A * 8/1992 Schultz .................... C04B 35/58
                                                     148/103
(Continued)

FOREIGN PATENT DOCUMENTS

CN    103021621    4/2013
CN    103312055    9/2013
(Continued)

OTHER PUBLICATIONS

Japanese Office Action for Japanese Patent Application No. 2015-505369 mailed on Jan. 26, 2016.
(Continued)

*Primary Examiner* — Kiley Stoner
(74) *Attorney, Agent, or Firm* — Amin, Turocy & Watson LLP

(57) ABSTRACT

The magnet has a composition expressed by $R_p Fe_q M_r Cu_t Co_{100-p-q-r-t}$. The magnet has a metallic structure including a main phase having a $Th_2 Zn_{17}$ crystal phase. The main phase has crystal grains. 5% or less of the crystal grains having a grain diameter equal to or smaller than 10 μm, 40% or less of the crystal grains having crystal orientation perpendicular to (001) plane of the $Th_2 Zn_{17}$ crystal phase in a direction deviated 30 degrees or more relative to an axis of easy magnetization.

9 Claims, 2 Drawing Sheets

(51) Int. Cl.
*C22C 30/02* (2006.01)
*H02K 1/02* (2006.01)
*H01F 1/055* (2006.01)
*H01F 1/08* (2006.01)
*H01F 1/059* (2006.01)

(52) U.S. Cl.
CPC .............. *H01F 1/086* (2013.01); *H02K 1/02* (2013.01); *H01F 1/0596* (2013.01)

(58) Field of Classification Search
USPC .................................................. 148/101–103
See application file for complete search history.

(56) References Cited

U.S. PATENT DOCUMENTS

| | | | | |
|---|---|---|---|---|
| 5,137,588 A * | 8/1992 | Wecker | .................... | C04B 35/58 148/103 |
| 5,288,339 A * | 2/1994 | Schnitzke | ........... | C01B 21/0602 148/101 |
| 5,395,459 A * | 3/1995 | Pinkerton | .............. | H01F 1/059 148/101 |
| 5,425,818 A * | 6/1995 | Hirosawa | .............. | H01F 1/0593 148/101 |
| 5,482,572 A * | 1/1996 | Eggert | .................. | C22C 1/0441 148/101 |
| 5,609,695 A * | 3/1997 | Kojima | .................. | B22F 9/023 148/101 |
| 5,684,076 A * | 11/1997 | Takahashi | ................ | C08K 3/08 148/101 |
| 5,720,828 A * | 2/1998 | Strom-Olsen | ........... | H01F 1/059 148/101 |
| 5,750,044 A * | 5/1998 | Yoneyama | ............ | H01F 1/0596 148/301 |
| 5,886,077 A * | 3/1999 | Takahashi | ................ | C08K 3/08 148/101 |
| 5,916,376 A * | 6/1999 | Fukuno | .................. | H01F 1/059 148/101 |
| 6,406,559 B2 * | 6/2002 | Sakurada | ................ | H01F 1/059 148/101 |
| 6,413,327 B1 * | 7/2002 | Okajima | ................ | H01F 1/059 148/301 |
| 6,416,593 B2 * | 7/2002 | Sakurada | ................ | H01F 1/059 148/101 |
| 6,468,440 B1 * | 10/2002 | Sakurada | ................ | H01F 1/059 148/101 |
| 6,546,968 B2 * | 4/2003 | Nakagawa | ........... | G11B 5/4813 140/104 |
| 6,565,673 B1 * | 5/2003 | Gong | .................... | H01F 1/0551 148/101 |
| 7,022,252 B2 * | 4/2006 | Mochizuki | ............ | H01F 1/0571 148/101 |
| 8,179,068 B2 | 5/2012 | Yuuki et al. | | |
| 8,552,678 B2 | 10/2013 | Yuuki et al. | | |
| 8,884,576 B2 | 11/2014 | Yuuki et al. | | |
| 2001/0051246 A1 * | 12/2001 | Iwasaki | ................ | H01F 1/0558 428/66.6 |
| 2002/0014283 A1 * | 2/2002 | Iriyama | ................ | B22F 1/0055 148/301 |
| 2002/0020469 A1 | 2/2002 | Okayama et al. | | |
| 2002/0054825 A1 * | 5/2002 | Sukaki | .................... | C22C 1/0441 420/83 |
| 2002/0129872 A1 * | 9/2002 | Ohashi | .................. | H01F 1/0596 148/103 |
| 2003/0000600 A1 | 1/2003 | Okayama et al. | | |
| 2003/0084964 A1 | 5/2003 | Okayama et al. | | |
| 2004/0149357 A1 * | 8/2004 | Kakimoto | ................ | B01J 3/08 148/301 |
| 2005/0189042 A1 * | 9/2005 | Ohashi | .................. | C22C 1/0441 148/301 |
| 2008/0066575 A1 * | 3/2008 | Yang | ........................ | B22F 3/18 75/229 |
| 2010/0068512 A1 * | 3/2010 | Imaoka | .................. | B82Y 30/00 428/336 |
| 2010/0289366 A1 * | 11/2010 | Komuro | ................ | C22C 1/0441 310/156.01 |
| 2011/0057756 A1 * | 3/2011 | Marinescu | .............. | B22F 1/007 335/302 |
| 2011/0240909 A1 * | 10/2011 | Kanda | .................... | H01F 1/0555 252/62.55 |
| 2011/0241810 A1 * | 10/2011 | Horiuchi | ................ | C22C 1/0433 335/302 |
| 2011/0278976 A1 * | 11/2011 | Horiuchi | ................ | C22C 19/07 310/152 |
| 2012/0074804 A1 * | 3/2012 | Horiuchi | ................ | H01F 1/0596 310/152 |
| 2012/0075046 A1 * | 3/2012 | Hagiwara | ............. | H01F 1/0596 335/302 |
| 2012/0145944 A1 * | 6/2012 | Komuro | ................ | C01G 49/00 252/62.51 R |
| 2012/0146444 A1 * | 6/2012 | Horiuchi | ................ | C22C 19/07 310/152 |
| 2012/0242180 A1 * | 9/2012 | Horiuchi | ................ | H01F 1/0596 310/152 |
| 2013/0020527 A1 * | 1/2013 | Li | ........................ | C22C 33/0278 252/62.55 |
| 2013/0076184 A1 * | 3/2013 | Horiuchi | ................ | B22F 3/02 310/152 |
| 2013/0082559 A1 * | 4/2013 | Hagiwara | ............. | H02K 1/2766 310/152 |
| 2013/0241333 A1 * | 9/2013 | Horiuchi | ................ | C22C 19/07 310/152 |
| 2013/0241681 A1 * | 9/2013 | Horiuchi | ................ | C22C 19/00 335/302 |
| 2013/0241682 A1 * | 9/2013 | Horiuchi | ................ | H01F 1/0557 335/302 |
| 2013/0257209 A1 * | 10/2013 | Sakurada | ................ | H01F 1/10 310/152 |
| 2014/0139063 A1 * | 5/2014 | Horiuchi | ................ | H01F 1/01 310/156.01 |
| 2014/0139064 A1 * | 5/2014 | Horiuchi | ................ | H01F 1/01 310/156.01 |
| 2014/0139305 A1 * | 5/2014 | Horiuchi | ................ | H01F 1/01 335/302 |
| 2014/0184133 A1 | 7/2014 | Yuuki et al. | | |
| 2015/0093285 A1 * | 4/2015 | Hinderberger | .......... | C22C 38/00 420/83 |
| 2015/0132174 A1 * | 5/2015 | Marinescu | ............ | H01F 1/0577 419/19 |
| 2015/0143952 A1 * | 5/2015 | Horiuchi | ................ | H01F 1/0557 75/228 |
| 2015/0147228 A1 * | 5/2015 | Endo | ........................ | H02K 1/02 420/582 |
| 2015/0194246 A1 * | 7/2015 | Horiuchi | ................ | C22C 19/07 310/152 |
| 2015/0221422 A1 * | 8/2015 | Sakurada | ................ | C22C 1/00 310/152 |
| 2015/0228385 A1 * | 8/2015 | Horiuchi | ................ | H01F 1/086 310/152 |
| 2015/0270038 A1 * | 9/2015 | Endo | ........................ | H01F 1/0596 310/152 |
| 2015/0270039 A1 * | 9/2015 | Horiuchi | ................ | C22C 19/07 310/152 |
| 2015/0270040 A1 * | 9/2015 | Horiuchi | ................ | C22C 19/07 310/152 |
| 2015/0318089 A1 * | 11/2015 | Li | .......................... | H01F 1/059 335/302 |
| 2015/0380134 A1 * | 12/2015 | Machida | ................ | H01F 1/055 335/302 |
| 2016/0086702 A1 * | 3/2016 | Horiuchi | ................ | C22C 19/07 310/44 |
| 2016/0155548 A1 * | 6/2016 | Horiuchi | ................ | C22C 19/07 310/152 |
| 2017/0002445 A1 * | 1/2017 | Hagiwara | ............. | C22C 19/07 |

(56) References Cited

U.S. PATENT DOCUMENTS

| | | | | |
|---|---|---|---|---|
| 2017/0018341 A1* | 1/2017 | Horiuchi | ............... | B22F 3/10 |
| 2017/0018978 A1* | 1/2017 | Horiuchi | ............... | H02K 1/17 |

FOREIGN PATENT DOCUMENTS

| | | |
|---|---|---|
| DE | 102013201492 | 9/2013 |
| JP | 06-212327 | 8/1994 |
| JP | 09-111383 | 4/1997 |
| JP | 2002-033206 | 1/2002 |
| JP | 2008-029148 | 2/2008 |
| JP | 2008-043172 | 2/2008 |
| JP | 2013-072097 | 4/2013 |
| JP | 2013-191815 | 9/2013 |
| JP | 2014-192193 | 10/2014 |
| JP | 2015-026795 | 2/2015 |
| WO | 2014156031 | 10/2014 |
| WO | 2014156047 | 10/2014 |

OTHER PUBLICATIONS

International Search Report for International Patent Application No. PCT/JP2014/005971 dated May 19, 2015, 5 pages.
Written Opinion for International Patent Application No. PCT/JP2014/005971 dated May 19, 2015, 3 pages.

\* cited by examiner

PERMANENT MAGNET, MOTOR, AND GENERATOR

CROSS-REFERENCE TO RELATED APPLICATIONS

This application is a continuation of prior International Application No. PCT/JP2014/005971 filed on Nov. 28, 2014; the entire contents of all of which are incorporated herein by reference.

FIELD

Embodiments disclosed herein generally relate to a permanent magnet, a motor, and a generator.

BACKGROUND

Known examples of the high-performance rare earth magnet include an Sm—Co-based magnet, an Nd—Fe—B-based magnet, and a similar magnet. Fe and Co in such magnets contribute to an increase in saturation magnetization. These magnets contain a rare earth element such as Nd and Sm. Derived of a behavior of 4f electron in the rare earth elements at a crystal field, the rare earth elements bring about large magnetic anisotropy. This creates a large coercive force, thereby providing a high-performance magnet.

Such high-performance magnet is mainly used for electrical devices such as a motor, a speaker, and a measuring instrument. In recent years, requests on downsizing, weight reduction, and low power consumption have been increased on various electrical devices. In response to the requests, there is a demand for a permanent magnet with higher performance that has an improved maximum magnetic energy product ($BH_{max}$) of the permanent magnet. In recent years, a variable magnetic flux motor has been proposed. This contributes to an improvement in efficiency of a motor.

Since the Sm—Co-based magnet features high Curie temperature, the Sm—Co-based magnet can achieve good motor property at high temperature. However, a higher coercive force, higher magnetization, and an improvement in a squareness ratio have been desired. It is presumed that high concentration of Fe is effective to increase the magnetization of the Sm—Co-based magnet. However, with the conventional manufacturing method, high concentration of Fe deteriorates the squareness ratio. In order to provide a high-performance magnet for motor, therefore, a technique that achieves the good squareness ratio while improving the magnetization with the high Fe concentration composition is necessary.

SUMMARY

An object of the embodiment is to regulate a metallic structure of an Sm—Co-based magnet thereby providing a high-performance permanent magnet.

A permanent magnet of an embodiment of the present invention has a composition expressed by a composition formula: $R_pFe_qM_rCu_tCo_{100-p-q-r-t}$ (in the formula, R is at least one element selected from the group consisting of rare earth elements, M is at least one element selected from the group consisting of Zr, Ti, and Hf, p is a number satisfying a condition of $10.8 \leq p \leq 12.5$ atomic percent (at %), q is a number satisfying a condition of $25 \leq q \leq 40$ atomic percent, r is a number satisfying a condition of $0.88 \leq r \leq 4.3$ atomic percent, and t is a number satisfying a condition of $3.5 \leq t \leq 13.5$ atomic percent). The permanent magnet also has a metallic structure. The metallic structure includes a main phase having a $Th_2Zn_{17}$ crystal phase. A percentage of those crystal grains in the main phase which have a grain diameter equal to or smaller than 10 μm is equal to or smaller than 5%. A percentage of those crystal grains in the main phase which have a crystal orientation perpendicular to the (001) plane of the $Th_2Zn_{17}$ crystal phase in a direction deviated 30 degrees or more relative to the axis of easy magnetization is equal to or smaller than 40%.

DETAILED DESCRIPTION

Figure 1:
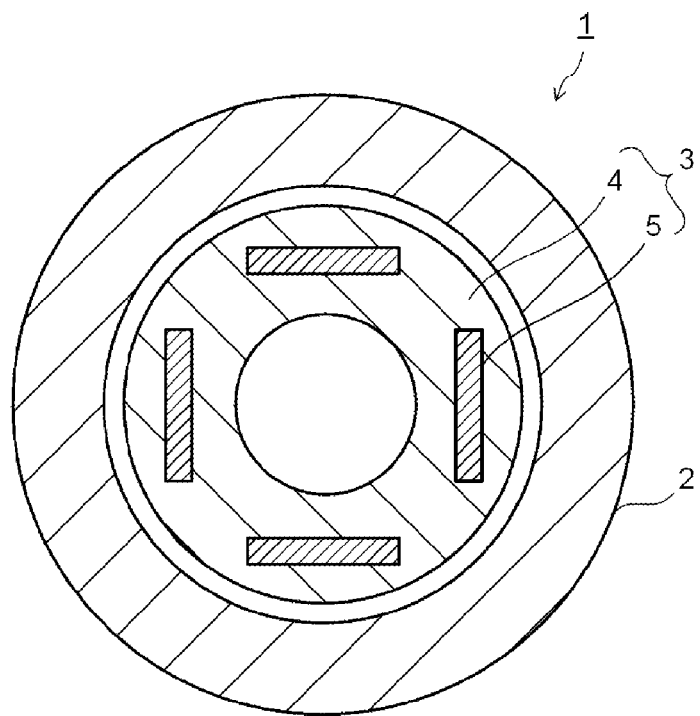
FIG. 1 is a view illustrating a permanent magnet motor.

Embodiments will now be described with reference to the accompanying drawings. The drawings are schematically illustrated. For example, the relationship between a thickness and plane dimensions, a ratio of thicknesses of respective layers, and similar parameters may differ from actual parameters. In the embodiments, like or same reference numerals designate corresponding or identical configurations, and therefore such configurations will not be described repeatedly.

First Embodiment

The following describes a permanent magnet of this embodiment.
<Exemplary Configuration of Permanent Magnet>

The permanent magnet of this embodiment includes a sintered body that has a composition expressed by a composition formula: $R_pFe_qM_rCu_tCo_{100-p-q-r-t}$ (in the formula, R is at least one element selected from the group consisting of rare earth elements, M is at least one element selected from the group consisting of Zr, Ti, and Hf, p is a number satisfying a condition of $10.8 \leq p \leq 12.5$ atomic percent, q is a number satisfying a condition of $25 \leq q \leq 40$ atomic percent, r is a number satisfying a condition of $0.88 \leq r \leq 4.3$ atomic percent, and t is a number satisfying a condition of $3.5 \leq t \leq 13.5$ atomic percent).

The R in the composition formula is an element that can provide a magnet material with large magnetic anisotropy. The R element is one element or a plurality of elements selected from the group consisting of the rare earth elements including, for example, yttrium (Y). For example, samarium (Sm), cerium (Ce), neodymium (Nd), praseodymium (Pr), or a similar material can be used as the R element. Especially, the use of Sm is preferable. For example, in the case where a plurality of elements containing Sm are used as the R element, the Sm concentration is designed to be 50 atomic percent or more with respect to all the elements usable as the R element. This enhances performance of the magnet material, for example, a coercive force. Preferably Sm is included by 70 atomic percent or more with respect to the elements usable as the R element, and more preferably Sm is included by 90 atomic percent or more.

When the concentration of the element that can be used as the R element is set to between 10.8 atomic percent and 12.5 atomic percent inclusive, the coercive force can be increased. If the concentration of the element that can be used as the R element is less than 10.8 atomic percent, then a large amount of α-Fe precipitates, and this decreases the coercive force. If the concentration of the element that can be used as the R element is greater than 12.5 atomic percent, then the saturation magnetization is deteriorated. Preferably the concentration of the element that can be used as the R element is between 10.9 atomic percent and 12.1 atomic percent inclusive, and more preferably the concentration of the element that can be used as the R element is no smaller than 11.0 atomic percent and no greater than 12.0 atomic percent.

The M in the composition formula is an element that can express a large coercive force with the composition of high Fe concentration. The M element is, for example, one element or a plurality of elements selected from the group consisting of titanium (Ti), zirconium (Zr), and hafnium (HO. If the content r of the M element is greater than 4.3 atomic percent, then a heterogeneous phase that excessively contains the M element is likely to be generated. This tends to deteriorate both the coercive force and the magnetization. If the content r of the M element is less than 0.88 atomic percent, then an effect of increasing the Fe concentration tends to become small. In view of this, the content r of the M element is preferably between 0.88 atomic percent and 4.3 atomic percent inclusive. The content r of the element M is more preferably between 1.14 atomic percent and 3.58 atomic percent inclusive. The content r is further preferably between 1.49 atomic percent and 2.24 atomic percent inclusive. The content r is yet further preferably between 1.55 atomic percent and 2.23 atomic percent inclusive.

The M element preferably contains at least Zr. In particular, when 50 atomic percent or more of the M element is Zr, this enhances the coercive force of the permanent magnet. Among the M elements, Hf is especially expensive. If Hf is used, therefore, a small amount of use is preferable. For example, it is preferable that the content of Hf be less than 20 atomic percent of the M element.

Cu is an element that can express the high coercive force in the magnet material. The content of Cu is, for example, preferably from 3.5 atomic percent up to 13.5 atomic percent (i.e., between 3.5 atomic percent and 13.5 atomic percent inclusive). If the content of Cu is greater than this range, the magnetization is significantly reduced. If the content of Cu is smaller than this range, it becomes difficult to obtain a high coercive force and a good squareness ratio. The content t of Cu is more preferably from 3.9 atomic percent up to 9.0 atomic percent. The content t of Cu is further preferably from 4.3 atomic percent up to 5.8 atomic percent.

Fe is an element which mainly performs the magnetization of the magnet material. When the content of Fe is large, the saturation magnetization of the magnet material can be enhanced. However, too much amount of Fe is less likely to obtain a desired crystal phase because of precipitation of α-Fe and phase separation. This may decrease the coercive force. In view of this, the content q of Fe is preferably from 25 atomic percent up to 40 atomic percent. The content q of Fe is more preferably from 26 atomic percent up to 36 atomic percent. The content q is further preferably from 30 atomic percent up to 33 atomic percent.

Co is an element which performs the magnetization of the magnet material and can express a high coercive force. Containing a large amount of Co brings about the high Curie temperature and enhances thermal stability of the magnetic property. A small amount of Co content decreases these effects. However, excessive addition of Co relatively reduces the proportion of Fe, and may result in deterioration of the magnetization. Replacing 20 atomic percent or less of Co with one element or a plurality of elements selected from the group consisting of Ni, V, Cr, Mn, Al, Si, Ga, Nb, Ta, and W enhances the magnetic property, for example, the coercive force.

The permanent magnet of this embodiment has a two-dimensional metallic structure. The two-dimensional metallic structure includes the main phase and a grain boundary phase. The main phase includes a hexagonal $Th_2Zn_{17}$ crystal phase (2-17 crystal phase). The grain boundary phase is arranged between crystal grains of the main phase. Furthermore, the main phase has a cell phase and a Cu rich phase. The cell phase includes a 2-17 crystal phase. The Cu rich phase includes a hexagonal $CaCu_5$ crystal phase (1-5 crystal phase). Preferably, the Cu rich phase is formed around the cell phase. The above structure may be referred to as a cell structure. The Cu rich phase also includes a cell wall phase that separates the cell phase. Preferably the c-axis of the $Th_2Zn_{17}$ crystal phase extends in parallel to the axis of easy magnetization. It should be noted that the term "parallel" may include an approximately parallel condition, i.e., ±10 degree deviation from the true parallel.

The Cu rich phase is a phase of high Cu concentration. The Cu concentration of the Cu rich phase is higher than the Cu concentration of the $Th_2Zn_{17}$ crystal phase. For example, the Cu concentration of the Cu rich phase is preferably 1.2 times or more of the Cu concentration of the $Th_2Zn_{17}$ crystal phase. The Cu rich phase is, for example, present lineally or in the form of plate at a cross section including the c-axis of the $Th_2Zn_{17}$ crystal phase. The structure of the Cu rich phase is not specifically limited. For example, the hexagonal $CaCu_5$ crystal phase (1-5 crystal phase) can be listed as an exemplary structure of the Cu rich phase. The permanent magnet of this embodiment may include a plurality of Cu rich phases of different phases.

The magnetic domain wall energy of the Cu rich phase is greater than the magnetic domain wall energy of the $Th_2Zn_{17}$ crystal phase. This difference in the magnetic domain wall energy prohibits movements (shifting) of the magnetic domain wall. Specifically, the Cu rich phase serves as a pinning site, and therefore it is possible to restrict the movements (shifting) of the magnetic domain wall between a plurality of cell phases. In particular, when the cell structure is formed, the effect of restricting the movements of the magnetic domain wall is enhanced. This may be referred to as magnetic domain wall pinning effect. Thus, it is more preferred that the Cu rich phase is formed around the cell phase.

In the Sm—Co-based magnet that contains Fe in the amount of 25 atomic percent or more, it is preferred that the Cu concentration of the Cu rich phase is between ten atomic percent and 60 atomic percent inclusive. When the Cu concentration of the Cu rich phase increases, the coercive force and the squareness ratio increase. In the area where the Fe concentration is high, the Cu concentration of the Cu rich phase is likely to vary. For example, one Cu rich phase may have a high magnetic domain wall pinning effect and another Cu rich phase may have a small magnetic domain wall pinning effect. This deteriorates the coercive force and the squareness ratio.

If the magnetic domain wall shifts from the pinning site and moves, the magnetization is inverted correspondingly. This decreases the magnetization. If all the magnetic domain walls shift from the pinning site in a certain magnetic field upon application of the external magnetic field, the decrease in the magnetization occurs little upon application of the magnetic field. Accordingly, a good squareness ratio is obtained. In other words, if the magnetic domain wall shifts from the pinning site and moves in a magnetic field that is weaker than the coercive force upon application of a magnetic field, it is assumed that the magnetization drops correspondingly and the squareness ratio drops.

If the proportion of those crystal grains in the main phase which have a crystal orientation (c-axis of the $Th_2Zn_{17}$ crystal phase) perpendicular to the (001) plane of the $Th_2Zn_{17}$ crystal phase in a direction deviated 30 degrees or more relative to the axis of easy magnetization is large, i.e., if the proportion of the crystal grains that have an orientation different (deviation) of 30 degrees or more from the axis of easy magnetization is large, then the squareness ratio may drop. In particular, fine crystal grains having a grain diameter of ten μm or less tend to have the orientation difference from the axis of easy magnetization, and tend to have a reduced orientation. It should be noted that the term "perpendicular" may include an approximately perpendicular condition, i.e., ±10 degree deviation from the true perpendicular direction.

In this embodiment, the proportion of those crystal grains in the main phase which have a grain diameter equal to or smaller than 10 μm is regulated to be 5% or less. Further, the proportion of those crystal grains in the main phase which have a crystal orientation perpendicular to the (001) plane of the $Th_2Zn_{17}$ crystal phase in a direction deviated 30 degrees or more relative to the axis of easy magnetization is regulated to 40% or less. This significantly improves the squareness ratio. The proportion of those crystal grains in the main phase which have a grain diameter equal to or smaller than 10 μm is preferably equal to or less than 4.5%, and more preferably equal to or less than 4.3%. The proportion of those crystal grains in the main phase which have the crystal orientation perpendicular to the (001) plane of the $Th_2Zn_{17}$ crystal phase in a direction deviated 30 degrees or more relative to the axis of easy magnetization is preferably equal to or smaller than 38%, and more preferably equal to or smaller than 36%.

In order to avoid or reduce the deterioration of the squareness ratio, it is assumed that increasing the area of the cell structure is important. The above-described cell structure is not likely to be formed in, for example, the grain boundary phase. Also, the cell structure is difficult to be formed around a different type of crystal phase that segregates on the crystal grains of the main phase. If the crystal orientation is disordered in the different type of crystal phase, then the squareness ratio drops even if the crystal grains grow. The Cu concentration and M concentration of the above-mentioned different type of crystal phase are higher than the Cu concentration and M concentration of the main phase. The above-mentioned different type of crystal phase is referred to as a Cu-M rich phase. The grain boundary phase may include the Cu-M rich phase.

For example, the Cu-M rich phase may have a composition expressed by a composition formula: $R_{p1}Fe_{q1}M_{r1}Cu_{t1}Co_{100-p1-q1-r1-t1}$ (p1 is a number satisfying 8≤p1≤20 atomic percent, q1 is a number satisfying 15≤q1≤35 atomic percent, r1 is a number satisfying 2<r1≤15 atomic percent, and t1 is a number satisfying 5≤t1≤25 atomic percent). Thus, the Cu concentration of the Cu-M rich phase is between five atomic percent and 25 atomic percent inclusive, and preferably equal to or greater than six atomic percent but less than 20 atomic percent. The M concentration of the Cu-M rich phase is between two atomic percent and 15 atomic percent inclusive, and preferably equal to or greater than two atomic percent but less than eleven atomic percent. Preferably, the Cu-M rich phase contains, for example, Zr.

The Cu element and the M element are absent (or short) around the Cu-M rich phase. Thus, the phase separation is unlikely to occur, and the cell structure is not formed. Accordingly, a good magnetic property is not obtained. Because of the Cu-M rich phase that segregates at the grain boundary and other locations, the magnetic property of the permanent magnet may drop.

The diameter of the Cu-M rich phase is preferably equal to or less than 10 μm. When the diameter of the Cu-M rich phase is small, the area of shortage of the Cu and M elements around the Cu-M rich phase decreases. Thus, it becomes possible to restrict the influence on the composition around the Cu-M rich phase. This allows the area of the cell structure to increase. Thus, it is possible to improve the magnetic property, particularly the squareness ratio. The diameter of the Cu-M rich phase is more preferably between 0.1 μm and 10 μm inclusive, and further preferably between 0.4 μm and 9 μm inclusive.

The average grain diameter of the crystal grains of the main phase is equal to or greater than 35 μm, and preferably equal to or greater than 40 μm. Because the diameter of the different type of crystal phase is small in this embodiment, it is possible to increase the crystal grain diameters of the crystal grains of the main phase. When the crystal grain diameters of the crystal grains of the main phase are large, it is possible to relatively reduce the volume fraction (volume percentage) of the grain boundary phase. Accordingly, it is possible to increase the area of the cell structure, and improve the magnetic property, especially the squareness ratio. In particular, when the average grain diameter of the crystal grains of the main phase is equal to or greater than 35 μm, then a significant improvement is made in the squareness ratio.

The composition of the permanent magnet is analyzed by, for example, an inductively coupled plasma (ICP) emission spectrochemical analysis method, an SEM-energy dispersive X-ray spectroscopy (SEM-EDX), a transmission electron microscope-EDX (TEM-EDX) or a similar method. The volumetric percentages (volume ratios) of the respective phases are comprehensively determined based on observations with the electron microscope and the optical microscope as well as X-ray diffraction and other techniques. For example, the volumetric percentages are obtained by an areametric analysis method that uses an electron micrograph of a cross section of the permanent magnet. The cross section of the permanent magnet is a cross section of a substantially center part that has the largest surface area of the specimen on a surface.

The metallic structure such as the $Th_2Zn_{17}$ crystal phase and the Cu rich phase is identified, for example, in the following manner. Firstly, samples are observed by a scanning transmission electron microscope (STEM). Prior to this, the samples may be observed by a scanning electron microscope (SEM) to find the location of the grain boundary phase, and the samples may be processed by a focused ion beam (FIB) such that the grain boundary phase is present in the field of vision. This can enhance the observation efficiency. The samples are those which have undergone the aging treatment. Preferably, the samples are not yet magnetized.

Subsequently, the concentrations of the respective elements in the Cu-M rich phase and other phases are measured by, for example, an STEM-energy dispersive X-ray spectroscopy (STEM-EDX).

When the concentrations of the respective elements are measured by the STEM-EDX, specimens are cut (taken out) from the interior of the sample at the depth of 1 mm or more from the surface of the sample. Also, the observation is carried out at the magnification of 100 k power (×100) to a plane that is parallel to the axis of easy magnetization (c-axis). It should be noted that when the diameter of the Cu-M rich phase is large, the magnification may be 50 k power.

For concentration measurement of the elements in each phase, a 3-dimension atom probe (3DAP) may be used. The analysis method using the 3DAP is an analysis method that applies a voltage to perform an electric field evaporation on an observed specimen and detects ions, which are generated upon the electric field evaporation, with a two-dimensional detector to identify an atomic arrangement. Ionic species are identified from flight time spent to reach the two-dimensional detector. Individually detected ions are consecutively detected in a depth direction and the ions are arranged (reconstructed) in the detected order. Then, a three-dimensional atomic distribution is obtained. Compared to the concentration measurement with the TEM-EDX, this analysis method can measure each element concentration in the crystal phase more precisely.

The element concentration in each phase is measured using the 3DAP in accordance with the following procedure. Firstly, the specimen is diced to thin pieces. From the thin pieces, needle-shaped specimens for pickup atom probe (AP) are prepared with the FIB.

The measurement with the 3DAP is performed on the inside of the sintered body. The inside of the sintered body is measured as follows. Firstly, at a center part of a longest side of a surface having the maximum area, the composition is measured at a surface portion and the inside of the cross section vertically cut to the side (in the case of a curved line, vertical (perpendicular) to a tangent line of the center portion). The measured position is defined as follows. In the cross section, the one-half position of each side is set as a starting point. A first reference line and a second reference line are set. The first reference line is drawn vertical to the side and toward the inside up to the end portion. The second reference line is drawn from the center of each corner portion as the starting point, with the one-half position of an angle of an inner angle of the corner portion, toward the inside up to the end portion. Positions of 1% length of the reference lines from the starting points of the first reference line and second reference line are defined as surface portions, and the position of 40% is defined as the inside. In the case where a corner portion has a curvature by, for example, chamfering, an intersection point of the extended adjacent sides is set as an end portion of the side (the center of the corner portion). In this case, the measured position is not from the intersection point but is a position from a part in contact with the reference line.

By deciding the measured positions as described above, for example, in the case of the cross section being a square, the reference lines include four first reference lines and four second reference lines, eight in total. The measured positions become eight positions at the surface portion and inside, respectively. In this embodiment, all the eight positions of the surface portion and inside are preferably within the above-described composition range. However, it is only necessary that at least four positions or more of the surface portion and inside be within the above-described composition range. In this case, the sole reference line does not specify the relationship between the surface portion and the inside. The observation plane inside the sintered body which is specified in this manner is polished and smoothed, and then is observed. For example, the observed positions by the TEM-EDX during the concentration measurement are arbitrary twenty positions in each phase. An average value of these measured values, which do not include the maximum value and the minimum value among all the measured values at the respective positions, is calculated. This average value is regarded as the concentration of the element concerned. The measurement with the 3DAP is carried out in a similar manner.

In the measurement results of the concentrations in the Cu rich phase with the 3DAP, it is preferred that the Cu concentration profile in the Cu rich phase is sharp. Specifically, the full width at half maximum (FWHM) of the Cu concentration profile is preferably equal to or smaller than 5 nm. With this Cu concentration profile, it is possible to obtain a high coercive force. This is because the magnetic domain wall energy difference steeply appears between the cell phase and the Cu rich phase and the pinning is easily applied on the magnetic domain wall when the Cu profile in the Cu rich phase is sharp.

The full width at half maximum (FWHM) of the Cu concentration profile in the Cu rich phase is obtained in the following manner. Based on the above-described method with the 3DAP, the highest value (PCu) of the Cu concentration is measured (calculated, found) from the Cu profile. Then, the width at which a half (PCu/2) of the maximum value (peak) is reached is measured, i.e., the full width at half maximum (FWHM) is measured. Such measurement is carried out for ten peaks, and the average value of the ten values is defined as the full width at half maximum (FWHM) of the Cu profile. When the full width at half maximum (FWHM) of the Cu profile is equal to or less than 3 nm, the coercive force is more enhanced. When the full width at half maximum (FWHM) of the Cu profile is equal to or less than 2 nm, the coercive force is further enhanced.

The diameters of the cell phase, the Cu-M rich phase, and the Cu rich phase are obtained as follows. An arbitrary phase is selected in the STEM-EDX mapping image, and a straight line A is drawn in the selected phase such that the straight line A becomes the longest line with the opposite ends of the straight line being in contact with other phases. Then, a straight line B is drawn to extend through the midpoint of the straight line A such that the straight line B is perpendicular to the straight line A and the opposite ends of the straight line B are in contact with other phases. The average of the length of the straight line A and the length of the straight line B is taken as the diameter D of the phase. The diameter D is calculated for at least one arbitrary phase in this manner. The diameters D are calculated in the five fields of vision for each sample. The average of the diameters (D) is defined as the diameter (D) of the phase.

The grain diameter of the crystal grains of the main phase and the crystal orientation may be measured by the SEM-electron backscattering pattern (SEM-EBSP). The procedure for obtaining the average grain diameter of the crystal grains will be described below. Firstly, a pre-treatment is carried out. Specifically, a specimen is embedded in an epoxy resin material, and undergoes the mechanical polishing and buffing. Then, the resulting specimen is washed with water, and the water removal is carried out by the air blow. After the water removal, the specimen is surface treated by a dry etching machine. Subsequently, the surface of the specimen is observed with a scanning electron microscope S-4300SE, manufactured by Hitachi High-Technologies Corporation, which has an EBSD system—Digiview, manufactured by TSL Co., Ltd. The observation conditions include an accelerating voltage of 30 kV and the measuring area of 500 µm×500 µm. The observation results are used to obtain the average grain diameter of the crystal grains present in the measured area under the following conditions. It should be noted that the measurement with the SEM-EBSP may be performed to the inside of the sintered boy in a similar manner to the measurement with the 3DAP.

The directions (orientations) of all pixels in the measurement area are measured, with the step size being 2 μm. If there is an orientation difference of 5 degrees or more between adjacent pixels at a boundary, then that boundary is regarded as a grain boundary phase. It should be noted, however, that if the measuring points in a crystal grain is less than five, that crystal grain is not regarded as the crystal grain, and that if a crystal grain reaches an end of the measurement area, that crystal grain is not regarded as the crystal grain. The grain area is an area in a crystal grain surrounded by the grain boundary phase. The average grain area is an average value of areas of crystal grains that exist in the measurement area. The grain diameter is a diameter of a perfect circle that has the same area as the area of the same crystal grain. The average grain diameter is an average value of grain diameters of crystal grains that exist in the measurement area. It should be noted that the crystal grain that has a grain diameter of 10 μm or less can be a heterogeneous phase. Thus, the crystal grains having a grain diameter of 10 μm or less are excluded when determining the average grain diameter.

The deviation of the crystal orientation perpendicular to the (001) plane of the $Th_2Zn_{17}$ crystal phase relative to the axis of the easy magnetization is measured in the following manner. Firstly, the crystal orientation color mapping is applied to the diffraction pattern obtained by the measurement with the SEM-EBSP. In these obtained mapping images, the orientation difference between the crystal grains having the c-axis parallel to the axis of easy magnetization and the crystal grains having the crystal orientation perpendicular to the (001) plane of the $Th_2Zn_{17}$ crystal phase inclined relative to the axis of easy magnetization can be expressed by a tone difference (brightness difference, or gradation). With the obtained results, it is possible to measure the crystal orientation perpendicular to the (001) plane of the $Th_2Zn_{17}$ crystal phase of each crystal grain.

The squareness ratio is defined as follows. Firstly, a DC B-H tracer measures DC magnetization characteristics at room temperature. Subsequently, from the B-H curve obtained from the measurement result, residual magnetization $M_r$, the coercive force $_iHc$, and a maximum energy product $(BH)_{max}$, which are basic properties of a magnet, are obtained. At this time, $M_r$ is used to obtain a maximum theoretical value $(BH)_{max}$ by the following expression (1).

$$(BH)_{max}(\text{theoretical value}) = M_r^2/4\mu_0 \quad (1)$$

The squareness ratio is evaluated from a ratio of $(BH)_{max}$ obtained by the measurement to $(BH)_{max}$ (theoretical value), and is obtained by the following expression (2).

$$(BH)_{max}(\text{actually measured value})/(BH)_{max}(\text{theoretical value}) \times 100 \quad (2)$$

The permanent magnet is, for example, also used as a bonded magnet. For example, a variable magnet in a variable magnetic flux drive system is proposed. The use of the magnet material of this embodiment for the variable magnet results in efficiency improvement, downsizing, and cost reduction of the system. To use the permanent magnet of this embodiment as the variable magnet, the aging treatment condition needs to be changed, for example, to limit the coercive force to between 100 kA/m and 350 kA/m inclusive.

<Method for Manufacturing the Permanent Magnet>

The following describes an exemplary method for manufacturing the permanent magnet. Firstly, prepared is an alloy powder that contains prescribed elements which are necessary to compose a permanent magnet. Then, the alloy powder is put in a metallic mold or die disposed in an electromagnet, and a magnetic field is applied onto the alloy powder while the alloy powder is shaped (molded) to a particular form by pressure molding (by pressing). A green compact (pressed powder) that has an oriented crystallographic axis is fabricated.

For example, a molten metal prepared by an arc melting method or a high frequency (induction) melting method may be cast to obtain an alloy ingot. The alloy ingot is crushed (pulverized) to prepare an alloy powder. In order for the alloy powder to have a desired composition, the alloy powder may be prepared from a mixture of powders having different compositions. A mechanical alloying method, a mechanical grinding method, a gas atomizing method, a reduction diffusion method or a similar method may be employed to prepare the alloy powder. When an alloy thin ribbon or strip is fabricated by the strip cast method, a flake-shaped alloy thin ribbon or strip is fabricated. Then, the alloy thin ribbon is crushed (pulverized) to provide the alloy powder. For example, the strip cast method pours molten alloy to a cooling roller that rotates at a peripheral velocity of between 0.1 m/second and 20 m/second inclusive. This brings about the thin ribbon that is formed by consecutively coagulating the molten alloy at a thickness of 1 mm or less. The peripheral velocity of less than 0.1 m/second is likely to vary the composition in the thin ribbon. The excess of the peripheral velocity of 20 m/second possibly deteriorates the magnetic property because, for example, the crystal grains become too fine. The peripheral velocity of the cooling roller is from 0.3 m/second up to 15 m/second, and further preferably from 0.5 m/second up to 12 m/second.

Furthermore, performing the heat treatment on the alloy powder or an alloy material before crushing homogenizes this material. For example, a jet mill or a ball mill may be used to crush the material. It should be noted that crushing the material in an inert gas atmosphere or in an organic solvent prevents oxidation of the powder.

When the average grain diameter of the powder after crushing is between 2 μm and 5 μm inclusive, and a proportion of the powder at the grain diameter of between 2 μm and 10 μm inclusive is 80% or more of the entire powder, a degree of orientation increases and the coercive force becomes large. To satisfy these conditions, the crushing with the jet mill is preferable.

For example, in the case of crushing with the ball mill, even if the average grain diameter of the powder is between 2 μm and 5 μm inclusive, a large amount of fine powder with the grain diameter of submicron level is contained. Aggregation of this fine powder is less likely to align the c-axis of the crystal at the $TbCu_7$ phase in the direction of the axis of easy magnetization in magnetic field orientation during pressing. This is likely to cause the deterioration of the degree of orientation. The fine powder possibly increases an amount of oxide in the sintered body, thereby resulting in deterioration of the coercive force. In particular, when the Fe concentration is equal to or greater than 25 atomic percent, a proportion of the powder, after crushing, having the grain diameter of 10 μm or more is preferably 10% or less of the entire powder. The Fe concentration of 25 atomic percent or more increases an amount of heterogeneous phase in the ingot that is a raw material. In this heterogeneous phase, not only the amount of powder increases but also the grain diameter tends to be large such that possibly the grain diameter becomes 20 μm or more.

When crushing such ingot, for example, the powder with the grain diameter of 15 μm or more possibly becomes the powder of the heterogeneous phase as it is. If the pulverized powder containing such coarse powder of the heterogeneous phase is pressed in a magnetic field to form the sintered body, the heterogeneous phase remains. This causes the deterioration of the coercive force, deterioration of magnetization, deterioration of squareness, or a similar deterioration. The deterioration of squareness makes the magnetization difficult. In particular, magnetization after assembling to a rotor or a similar component becomes difficult. Thus, the powder with the grain diameter of 10 μm or more is designed to be 10% or less of the entire powder. This reduces the deterioration of the squareness ratio and increases the coercive force in the high Fe concentration composition that contains Fe of 25 atomic percent or more.

After that, the sintering, a quality improvement treatment and a solution heat treatment are carried out. The quality improvement treatment is a treatment that regulates the metallic structure, especially, the macro structure. The solution heat treatment is a treatment that forms a $TbCu_7$ crystal phase (1-7 crystal phase) which serves as a precursor of the phase separation structure.

During the sintering, a heat treatment is applied on the green compact (pressed powder body) at a temperature between 1180° C. and 1220° C. inclusive. This temperature (holding temperature) is maintained for between one hour and 15 hours inclusive. If the holding temperature is lower than 1180° C., the resulting sintered body has a lower density. If the holding temperature is higher than 1220° C., the magnetic property is possibly deteriorated due to, for example, excessive vaporization of the R element (e.g., Sm) from the powder. More preferably, the holding temperature is between 1190° C. and 1210° C. inclusive. If the holding time is less than one hour, the density is likely to be non-uniform. This is likely to deteriorate the magnetization. Further, the crystal grain diameter in the sintered body decreases, and the grain boundary phase proportion becomes high. This can deteriorate the magnetization. The excess of the heat treatment time over 15 hours causes excessive vaporization of the R element from the powder, and possibly deteriorates the magnetic property. The holding time is more preferably between two hours and 13 hours inclusive, and further preferably between three hours and ten hours inclusive. When the heat treatment is carried out in a vacuum (under a reduced pressure condition) or in an Ar gas atmosphere, oxidation is suppressed. It should be noted that the vacuum condition (reduced pressure condition) may be maintained until the temperature becomes close to the holding temperature, then the atmosphere may be switched to the Ar gas atmosphere, and the temperature may be maintained to increase the density of the sintered body.

During the quality improvement treatment, the heat treatment is carried out at a temperature that is 10° C. (or more) lower than the heat treatment temperature of the sintering and that is 10° C. (or more) higher than the heat treatment temperature of the solution heat treatment. This temperature is held between two hours and twelve hours inclusive. If the heat treatment is not carried out at a temperature that is 10° C. (or more) lower than the heat treatment temperature of the sintering, it is not possible to sufficiently remove the heterogeneous phase, which is derived from a liquid phase and generated during the sintering. The orientation of the heterogeneous phase is often low. Thus, when such heterogeneous phase is present, the crystal orientation of the crystal grains tends to deviate from the axis of easy magnetization. This tends to decrease not only the squareness ratio but also the magnetization. Also, the solution heat treatment temperature is low, and it is difficult to sufficiently remove the heterogeneous phase which is generated during the sintering, in view of the element diffusion speed. Further, the grain growth speed is slow, and therefore a sufficient crystal grain diameter may not be obtained. Accordingly, an improvement in the squareness ratio cannot be expected. In contract, when the quality improvement treatment is performed at a temperature that is 10° C. (or more) higher than the holding temperature of the solution heat treatment, then it is possible to sufficiently remove the heterogeneous phase and have large crystal grains in the main phase.

For example, the holding temperature of the quality improvement treatment is preferably between 1130° C. and 1190° C. inclusive. If the temperature is lower than 1130° C. or higher than 1190° C., then the squareness ratio may drop. If the heat treatment time is shorter than two hours, then the diffusion is insufficient, the heterogeneous phase is not removed sufficiently, and the improvement in the squareness ratio is small. If the heat treatment time exceeds 12 hours, the R element such as Sm may evaporate, and therefore a good magnetic property may not result. The heat treatment time in the quality improvement treatment is more preferably between four hours and ten hours inclusive, and further preferably between six hours and eight hours inclusive. It is also preferred that the quality improvement treatment may be carried out in a vacuum or an inert gas (e.g., Ar gas) atmosphere in order to avoid the oxidation.

The effect of suppressing the generation of the heterogeneous phase is enhanced when the pressure in the chamber during the quality improvement treatment is a positive pressure. Thus, such positive pressure can reduce the ratio of the fine crystal grains having a grain diameter of 10 μm or less. This also reduces the ratio (percentage) of those crystal grains which have the crystal orientation perpendicular to the (001) plane of the $Th_2Zn_{17}$ crystal phase in a direction deviated 30 degrees or more relative to the axis of easy magnetization. Also, the excessive evaporation of the R element is suppressed, and therefore the deterioration of the coercive force is suppressed. The pressure in the chamber (inner pressure of the chamber) is, for example, between 0.15 MPa and 15 MPa inclusive, preferably between 0.2 MPa and 10 MPa inclusive, and more preferably between 1.0 MPa and 5.0 MPa inclusive.

In the solution heat treatment, the heat treatment is carried out at a temperature equal to or greater than 1090° C. but lower than 1170° C. This temperature is held between three hours and 28 hours inclusive. If the holding temperature of the solution heat treatment is lower than 1090° C. and equal to or higher than 1170° C., then the ratio (percentage) of the $TbCu_7$ crystal phase that is present in the specimen after the solution heat treatment is small. Accordingly, the magnetic property may drop. The holding temperature is preferably between 1100° C. and 1165° C. inclusive. If the holding time of the solution heat treatment is shorter than three hours, the constituent phase tends to become non-uniform, the coercive force tends to drop, the crystal grain diameter of the metallic structure tends to be small, the grain boundary phase ratio (percentage) tends to increase, and the magnetization tends to drop. If the holding temperature of the solution heat treatment exceeds 28 hours, there is a possibility that the magnetic property drops because, for example, the R element of the sintered boy evaporates. The holding time is preferably between four hours and 24 hours inclusive, and more preferably between ten hours and 18 hours inclusive. It should be noted that the oxidation of the powder may be suppressed when the solution heat treatment is carried out in a vacuum or in an inert gas (e.g., Ar gas) atmosphere.

Furthermore, after holding the isothermal temperature, the rapid cooling is performed. For example, the rapid cooling is performed at a cooling rate of 170° C./minute or more until the room temperature is reached. This stabilizes the $TbCu_7$ crystal phase, and is likely to express the coercive force. The cooling rate of less than 170° C./minute is likely to generate the $Ce_2Ni_7$ crystal phase (2-7 crystal phase) during the cooling. The presence of the 2-7 crystal phase possibly deteriorates the magnetization and also possibly decreases the coercive force. This is because Cu is often concentrated in the 2-7 crystal phase, this lowers the concentration of Cu in the main phase, and the phase separation is not likely to be caused by the aging treatment. Especially, with the composition including the Fe concentration of 25 atomic percent or more, the cooling rate tends to be important.

It should be noted that the cooling that is performed when the solution heat treatment is performed after the quality improvement treatment is preferably gentler than the rapid cooling after the solution heat treatment, i.e., the cooling is preferably slow cooling. For example, the slow cooling is carried out, after the quality improvement treatment, at the cooling rate of 15° C./minute or less, preferably at the cooling rate of 10° C./minute or less, and more preferably at the cooling rate of 5° C./minute or less. The slow cooling reduces the variations in the metallic structure, and further improves the squareness ratio.

Next, the aging treatment is applied to the sintered body after the rapid cooling. The aging treatment is a process to regulate the metallic structure to enhance the coercive force of the magnet. The aging treatment aims to separate the metallic structure of magnet into a plurality of phases.

In the aging treatment, the temperature is elevated to between 760° C. and 850° C. inclusive. Then, the reached temperature is maintained for between 20 hours and 60 hours inclusive (first holding). Subsequently, the slow cooling is carried out at the cooling rate of between 0.2° C./minute and 2.0° C./minute inclusive until the temperature drops to a value between 350° C. and 650° C. inclusive. The reached temperature is maintained for between 0.5 hour and 8 hours inclusive (second holding) for heat treatment. Then, the cooling is carried out until the temperature drops to room temperature. This provides the magnet of the sintered body.

If the first holding temperature is higher than 850° C., the cell phase becomes coarse, and the squareness ratio is likely to drop. If the holding temperature is lower than 760° C., the cell structure is not obtained sufficiently, thereby making it difficult to express the coercive force. The first holding temperature is, for example, more preferably between 780° C. and 840° C. inclusive. If the first holding time is less than 20 hours, an insufficient cell structure results, thereby making it difficult to express the coercive force. If the holding time is longer than 60 hours, the cell wall phase becomes excessively thick, and possibly the squareness ratio is deteriorated. For example, the first holding time is more preferably between 25 hours and 40 hours inclusive.

If the cooling rate of the slow cooling is less than 0.2° C./minute, then the cell wall phase tends to be excessively thick and the magnetization tends to decrease. If the cooling rate is greater than 2.0° C./minute, then a sufficient difference is not obtained in the Cu concentration between the cell phase and the cell wall phase. Thus, the coercive force tends to drop. The cooling rate of the slow cooling is, for example, between 0.4° C./minute and 1.5° C./minute inclusive, and preferably between 0.5° C./minute and 1.3° C./minute inclusive. If the slow cooling is performed to a temperature below 350° C., the above-described low temperature heterogeneous phase tends to result. If the slow cooling is performed to a temperature over 650° C., the Cu concentration in the Cu rich phase does not rise sufficiently, and a sufficient coercive force may not result. If the second holding time exceeds eight hours, the low temperature heterogeneous phase is generated, and possibly a sufficient magnetic property is not obtained.

It should be noted that the temperature may be maintained at a prescribed value for a predetermined time during the slow cooling process of the aging treatment, and the slow cooling may be resumed from that temperature. It should also be noted that the above-described aging treatment may be regarded as the main aging treatment, and a preliminary aging treatment may be carried out prior to the main aging treatment. The preliminary aging treatment maintains the temperature at a value lower than the first holding temperature for the holding time shorter than the first holding time. Maintaining the temperature at the prescribed value during the slow cooling process can further increase the squareness ratio, and the preliminary aging treatment can further increase the squareness ratio.

When the magnetic material having a high Fe concentration undergoes the sintering and the solution heat treatment, a heterogeneous phase such as a Cu-M rich phase tends to be generated. This is because the ratio (percentage) of the heterogeneous phase such as the Cu-M rich phase tends to increase as the Fe concentration becomes high. The heterogeneous phase is not removed sufficiently even if the sintered body that contains the heterogeneous phase is subjected to the solution heat treatment. Thus, a magnet having a large amount of heterogeneous phase is formed.

In this embodiment, the quality improvement treatment is carried out in addition to the sintering and the solution heat treatment. In the quality improvement treatment, the heat treatment is carried out in a particular (unique) temperature range, which is lower than the holding temperature of the sintering process and higher than the holding temperature of the solution heat treatment. This can remove the heterogeneous phase sufficiently. Thus, the form of the heterogeneous phase and the size of the crystal grains are controlled. The size of the crystal grains of the main phase and the orientation of the crystal grains are also controlled. In the metallic structure, therefore, the cell structure is easily formed around the grain boundary phase. For example, it is possible for the permanent magnet to have a good coercive force and a good squareness ratio even if the permanent magnet contains Fe by 25 atomic percent or more.

It should be noted that the quality improvement treatment may be performed at any timing after the sintering and prior to the aging treatment. For example, the quality improvement treatment may be divided and associated with a first solution heat treatment and a second solution heat treatment (re-solution heat treatment). The quality improvement treatment may be performed after the first solution heat treatment, and the second solution heat treatment may be performed after the quality improvement treatment. Alternatively, the quality improvement treatment may be performed more than once during the solution heat treatment (between the solution heat treatments).

Second Embodiment

The permanent magnet of the first embodiment is applicable to various motors and electric generators. The permanent magnet of the first embodiment is also applicable as a stationary magnet and a variable magnet for a variable magnetic flux motor and a variable magnetic flux electric generator. The use of the permanent magnet of the first embodiment enables to configure the various motors and electric generators. In applying the permanent magnet of the first embodiment to the variable magnetic flux motor, the configurations of the variable magnetic flux motor and a drive system may employ the known techniques.

The motor and the electric generator of this embodiment will be described below by referring to the accompanying drawings. FIG. 1 illustrates a permanent magnet motor of the second embodiment. The permanent magnet motor 1 illustrated in FIG. 1 includes a rotor (a rotating part) 3 in a stator (stationary part) 2. The rotor 3 includes an iron core 4. The iron core 4 includes permanent magnets 5, which are the permanent magnets of the first embodiment. The use of the permanent magnets of the first embodiment can provide, for example, a highly efficient, downsized (compact), and low-cost permanent magnet motor 1 based on properties of the respective permanent magnets and other factors.

Figure 2:
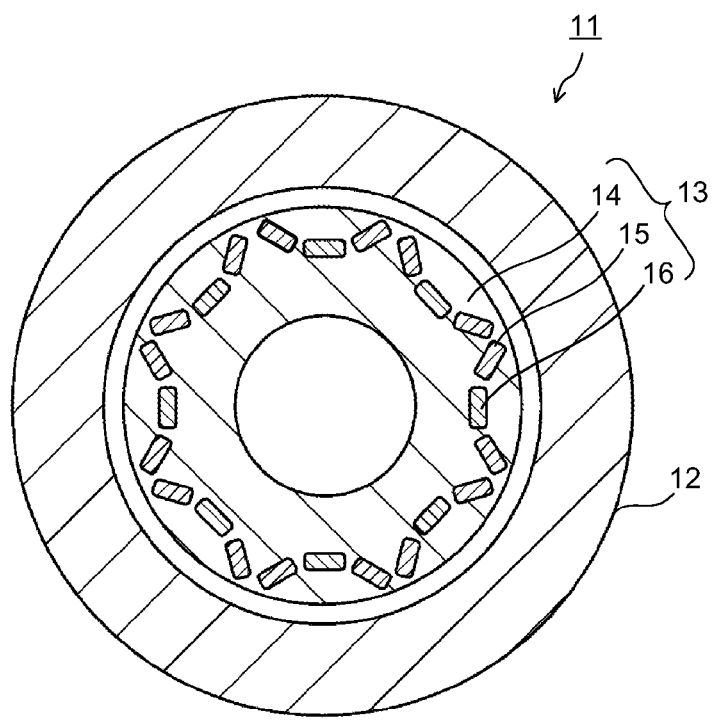
FIG. 2 is a view illustrating a variable magnetic flux motor.

FIG. 2 illustrates a variable magnetic flux motor of this embodiment. The variable magnetic flux motor 11 illustrated in FIG. 2 includes a rotor (a rotating part) 13 in a stator (stationary part) 12. The rotor 13 includes an iron core 14. The iron core 14 includes stationary magnets 15 and variable magnets 16, both of which are the permanent magnets of the first embodiment. A magnetic flux density (a flux quantum) of the variable magnet 16 can be variable. Because a magnetization direction of the variable magnet 16 is perpendicular to a Q-axis direction, a Q-axis current does not affect the variable magnet 16. Accordingly, the variable magnet 16 can be magnetized by a D-axis current. The rotor 13 includes a magnetization coil (not illustrated). As an electric current flow from a magnetization circuit to this magnetization coil in this structure, the magnetic field directly acts on the variable magnet 16.

Of the permanent magnet of the first embodiment, the stationary magnet 15 can have (exert) a preferable coercive force. To apply the permanent magnet of the first embodiment to the variable magnet 16, it is only necessary to regulate the coercive force, for example, within the range of between 100 kA/m and 500 kA/m inclusive by changing the above-described various conditions (e.g., the aging treatment condition) for the manufacturing method. The variable magnetic flux motor 11 illustrated in FIG. 2 can use the permanent magnet of the first embodiment for both the stationary magnet 15 and the variable magnet 16. It should be noted that the permanent magnet of the first embodiment may be used for any one of the stationary magnet 15 and the variable magnet 16. The variable magnetic flux motor 11 can output a large torque with a small-size apparatus. Accordingly, the variable magnetic flux motor 11 is preferable as a motor of a hybrid vehicle, an electric vehicle, or a similar vehicle that requires a high-output and compact motor.

Figure 3:
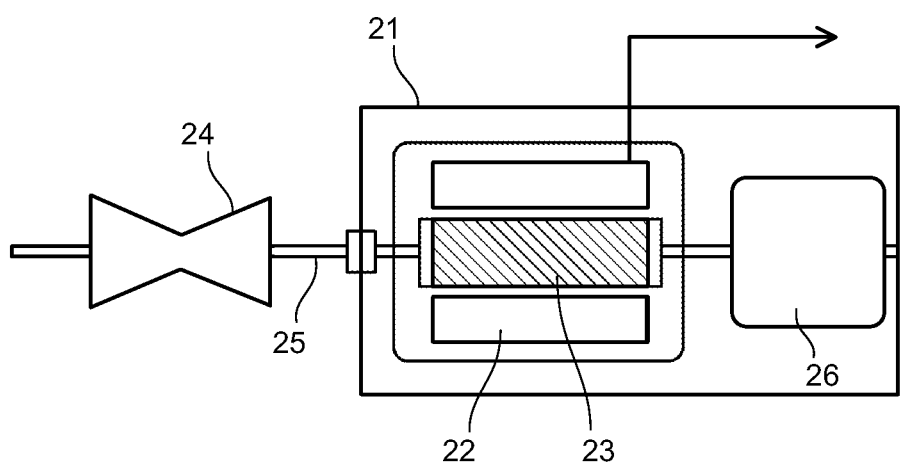
FIG. 3 is a view illustrating an electric generator.

FIG. 3 shows an electric generator of this embodiment. The electric generator 21 illustrated in FIG. 3 includes a stator (stationary part) 22 that uses the above-described permanent magnet(s). A rotor (a rotating part) 23 is disposed inside the stator (stationary part) 22. The rotor 23 is coupled to a turbine 24 via a shaft 25. The turbine 24 is disposed at one end of the electric generator 21. The turbine 24 is caused to rotate by, for example, a fluid supplied from the outside. It should be noted instead of rotating the shaft 25 by the turbine 24 that is rotated by the fluid, the shaft 25 may be rotated by dynamic rotation derived from regenerated energy of a vehicle or a similar energy. The stator 22 and the rotor 23 can use various known configurations.

The shaft 25 is in contact with a commutator (not shown). The commutator is disposed at the opposite side of the turbine 24 when viewed from the rotor 23. An electromotive force generated by the rotation of the rotor 23 is boosted to a system voltage and is transmitted as an output from the electric generator 21 via an isolated-phase bus and a main transformer (not illustrated). The electric generator 21 may be any of the usual electric generator and the variable magnetic flux electric generator. The rotor 23 generates a charge by static electricity from the turbine 2 and an axial current in association with electric power generation. In view of this, the electric generator 21 includes a brush 26. The brush 26 discharges the charge from the rotor 23.

As described above, the application of the permanent magnet of the first embodiment to the electric generator brings about the advantageous effects such as high efficiency, downsizing, and low cost.

While certain embodiments of the present invention have been described, these embodiments have been presented by way of example only, and are not intended to limit the scope of the invention. Indeed, the novel embodiments described herein may be embodied in a variety of other forms. Various omissions, substitutions, changes and modifications may be made to the embodiments described herein without departing from the spirit and scope of the present invention. The appended claims and their equivalents are intended to cover such embodiments and modifications as would fall within the scope and spirit of the invention.

EXAMPLES

In the following Examples, specific examples of the permanent magnet will be described. In the following Examples, the M element of the permanent magnet is Zr.

Examples 1 and 2

Respective raw materials for the permanent magnet were weighed, and mixed with each other at a prescribed ratio. The mixture was then melted by arc in an Ar gas atmosphere to prepare an alloy ingot. The alloy ingot was subjected to the heat treatment at 1170° C. for 16 hours. Then, the alloy ingot underwent coarse crushing and jet mill crushing such that an alloy powder was prepared as the raw material powder of the magnet. The prepared alloy powder was shaped (molded) to a particular form by pressing in a magnetic field to fabricate a compression molded body.

Subsequently, the compression molded body of the alloy powder was put in a chamber of a sintering furnace. The interior of the chamber was evacuated, and heated to 1175° C. The reached temperature was maintained for 20 minutes. Then, an Ar gas was introduced into the chamber of the sintering furnace. The temperature of the chamber interior (Ar atmosphere) of the sintering furnace was elevated to 1210° C. The reached temperature was maintained for four hours to perform the sintering. After that, the pressure of the Ar atmosphere in the chamber was adjusted to 0.5 MPa. The quality improvement treatment was carried out by maintaining the temperature at 1190° C. for six hours, as shown in Table 2. Then, the slow cooling was carried out at the cooling rate of 4.0° C./minute until the temperature dropped to 1165° C. The sintered body was maintained at the reached temperature for twelve hours to carry out the solution heat treatment. The sintered body was cooled to room temperature. The cooling rate after the solution heat treatment was 170° C./minute.

The sintered body that had undergone the solution heat treatment was heated to 750° C. The reached temperature was maintained for two hours. Then, the sintered body was slowly cooled at the cooling rate of 1.5° C./minute until the temperature dropped to 350° C. In the following treatment (aging treatment), the temperature was elevated to 835° C., and the reached temperature was maintained for 30 hours. Then, the slow cooling was performed at the cooling rate of 1.0° C./minute until the temperature dropped to 550° C. The reached temperature was maintained for four hours. Then, the slow cooling was performed at the cooling rate of 1.0° C./minute until the temperature dropped to 400° C. The reached temperature was maintained for one hour. After that, the sintered body was cooled to room temperature in the furnace. A magnet was obtained in this manner.

Also, the composition of the magnet was analyzed by an inductively coupled plasma (ICP) method. The composition analysis was carried out by the ICP method in the following manner. Firstly, a specimen that was taken from the prescribed measurement position was crushed (ground, pulverized) in a mortar. A certain amount of crushed specimen was measured by weight, and put in a quartz (silica) beaker. In addition, mixed acid (acid that includes nitric acid and hydrochloric acid) was put in the beaker. The beaker was heated to approximately 140° C. on a hot plate to completely melt the specimen in the beaker. The beaker was cooled as it was. Then, the specimen was moved to a PFA-made measuring flask to have a particular (predetermined) volume of specimen. This was used as the specimen solution.

The ICP emission spectrochemical analysis device was used to determine the quantities of components contained in the specimen solution with a calibration curve (standard curve) method. The ICP emission spectrochemical analysis device was SPS4000, manufactured by SII NanoTechnology Inc. The obtained composition of the magnet is shown in Table 1. The ratio (percentage) of those crystal grains in the main phase which have the grain diameter d of 10 μm or less (crystal grains with d≤10 μm) was measured, and the ratio (percentage) of those crystal grains which have the crystal orientation perpendicular to the (001) plane of the $Th_2Zn_{17}$ crystal phase in a direction deviated 30 degrees or more relative to the axis of easy magnetization (Δθ≥30 degrees) was measured. The squareness ratio, the coercive force, and the residual magnetization were also measured. The measurement results are shown in Table 3. The measuring device used for the Examples and Comparative Examples was HD2300, manufactured by Hitachi High-Technologies Corporation.

Examples 3, 4 and 5

The respective raw materials were weighed and mixed with each other at a prescribed ratio. The mixture was then melted by a high frequency wave in an Ar gas atmosphere to prepare an alloy ingot. The alloy ingot was subjected to the coarse crushing, and the heat treatment at 1180° C. for eight hours. Then, the alloy ingot was rapidly cooled until the temperature dropped to room temperature. The alloy ingot underwent the coarse crushing and the jet mill crushing such that an alloy powder was prepared as the raw material powder of the magnet. The prepared alloy powder was shaped (molded) to a particular form by pressing in a magnetic field to fabricate a compression molded body.

Subsequently, the compression molded body of the alloy powder was put in the chamber of the sintering furnace. The interior of the chamber was evacuated to a vacuum degree of $9.0 \times 10^{-3}$ Pa, and heated to 1170° C. The reached temperature was maintained for 20 minutes. Then, an Ar gas was introduced into the chamber of the sintering furnace. The temperature of the chamber interior (Ar atmosphere) of the sintering furnace was elevated to 1195° C. The reached temperature was maintained for five hours to perform the sintering. After that, the pressure of the Ar atmosphere in the chamber was adjusted to 0.2 MPa. The quality improvement treatment was carried out by maintaining the temperature at 1160° C. for two hours, as shown in Table 2. Then, the slow cooling was carried out at the cooling rate of 4.0° C./minute until the temperature dropped to 1140° C. The sintered body was maintained at the reached temperature for 16 hours to carry out the solution heat treatment. Then, the sintered body was cooled to room temperature. The cooling rate after the solution heat treatment was 150° C./minute.

The sintered body that had undergone the solution heat treatment was heated to 700° C. The reached temperature was maintained for two hours. Subsequently, the sintered body was subjected to the aging treatment, i.e., the sintered body was heated to 815° C., and the reached temperature was maintained for 50 hours. Then, the sintered body was slowly cooled at the cooling rate of 0.6° C./minute until the temperature dropped to 450° C. The reached temperature was maintained for four hours. Then, the slow cooling was performed at the cooling rate of 0.5° C./minute until the temperature dropped to 380° C. The reached temperature was maintained for one hour. After that, the sintered body was cooled to room temperature in the furnace. A magnet was obtained in this manner.

The ICP emission spectrochemical analysis device was used to determine the quantities of components contained in the specimen solution with a calibration curve (standard curve) method. The obtained composition of the magnet is shown in Table 1. Similar to other Examples, the ratio of those crystal grains satisfying d≤10 μm, the ratio of those crystal grains satisfying Δθ≥30 degrees, the squareness ratio, the coercive force, and the residual magnetization were also measured. The measurement results are shown in Table 3.

Examples 6 and 7

The respective raw materials were weighed and mixed with each other at a prescribed ratio. The mixture was then melted by a high frequency wave in an Ar gas atmosphere to prepare an alloy ingot. The alloy ingot was subjected to the coarse crushing, and the heat treatment at 1180° C. for eight hours. Then, the alloy ingot was rapidly cooled until the temperature dropped to room temperature. The alloy ingot underwent the coarse crushing and the jet mill crushing such that an alloy powder was prepared as the raw material powder of the magnet. The prepared alloy powder was shaped (molded) to a particular (predetermined) form by pressing in a magnetic field to fabricate a compression molded body.

Subsequently, the compression molded body of the alloy powder was put in the chamber of the sintering furnace. The interior of the chamber was evacuated to the vacuum degree of $7.5 \times 10^{-3}$ Pa, and heated to 1160° C. The reached temperature was maintained for 30 minutes. Then, an Ar gas was introduced into the chamber of the sintering furnace. The temperature of the chamber interior (Ar atmosphere) of the sintering furnace was elevated to 1180° C. The reached temperature was maintained for five hours to perform the sintering. After that, the pressure of the Ar atmosphere in the chamber was adjusted to 0.7 MPa. The quality improvement treatment was carried out by maintaining the temperature at 1160° C. for ten hours, as shown in Table 2. Then, the slow cooling was carried out at the cooling rate of 4.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 220° C./minute.

The sintered body that had undergone the solution heat treatment was heated to 670° C. The reached temperature was maintained for one hour. Subsequently, the sintered body was subjected to the aging treatment, i.e., the sintered body was heated to 840° C., and the reached temperature was maintained for 45 hours. Then, the sintered body was slowly cooled at the cooling rate of 0.6° C./minute until the temperature dropped to 500° C. The reached temperature was maintained for one hour. Then, the slow cooling was performed at the cooling rate of 0.5° C./minute until the temperature dropped to 400° C. The reached temperature was maintained for one hour. After that, the sintered body was cooled to room temperature in the furnace. A magnet was obtained in this manner.

Similar to other Examples, the ICP method was used to confirm (identify) the composition of each magnet. The obtained composition of each magnet is shown in Table 1. Similar to other Examples, the ratio of those crystal grains satisfying d≤10 μm, the ratio of those crystal grains satisfying Δθ≥30 degrees, the squareness ratio, the coercive force, and the residual magnetization were also measured. The measurement results are shown in Table 3.

Example 8

The respective raw materials were weighed and mixed with each other at a prescribed ratio. The mixture was then melted by a high frequency wave in an Ar gas atmosphere to prepare an alloy ingot. The alloy ingot was subjected to the coarse crushing, and the heat treatment at 1165° C. for twelve hours. Then, the alloy ingot was rapidly cooled until the temperature dropped to room temperature. The alloy ingot underwent the coarse crushing and the jet mill crushing such that an alloy powder was prepared as the raw material powder of the magnet. The prepared alloy powder was shaped (molded) to a particular form by pressing in a magnetic field to fabricate a compression molded body.

Subsequently, the compression molded body of the alloy powder was put in the chamber of the sintering furnace. The interior of the chamber was evacuated to the vacuum degree of $9.0 \times 10^{-3}$ Pa, and heated to 1160° C. The reached temperature was maintained for 30 minutes. Then, an Ar gas was introduced into the chamber of the sintering furnace. The temperature of the chamber interior (Ar atmosphere) of the sintering furnace was elevated to 1190° C. The reached temperature was maintained for four hours to perform the sintering. After that, the pressure of the Ar atmosphere in the chamber was adjusted to 0.5 MPa. The quality improvement treatment was carried out by maintaining the temperature at 1165° C. for six hours, as shown in Table 2. Then, the slow cooling was carried out at the cooling rate of 5.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 170° C./minute.

The sintered body that had undergone the solution heat treatment was heated to 710° C. The reached temperature was maintained for four hours. Subsequently, the sintered body was subjected to the aging treatment, i.e., the sintered body was heated to 830° C., and the reached temperature was maintained for 45 hours. Then, the sintered body was slowly cooled at the cooling rate of 0.8° C./minute until the temperature dropped to 600° C. The reached temperature was maintained for four hours. Then, the slow cooling was performed at the cooling rate of 0.5° C./minute until the temperature dropped to 400° C. The reached temperature was maintained for one hour. After that, the sintered body was cooled to room temperature in the furnace. A magnet was obtained in this manner.

Similar to other Examples, the ICP method was used to confirm (identify) the composition of each magnet. The obtained composition of the magnet is shown in Table 1. Similar to other Examples, the ratio of those crystal grains satisfying d≤10 μm, the ratio of those crystal grains satisfying Δθ≥30 degrees, the squareness ratio, the coercive force, and the residual magnetization were also measured. The measurement results are shown in Table 3.

Examples 9 to 13

The alloy powder that had the same composition as Example 8 was used as the raw material. The prepared alloy powder was shaped (molded) to a particular form by pressing in a magnetic field to fabricate a compression molded body. Subsequently, the compression molded body of the alloy powder was put in the chamber of the sintering furnace. The interior of the chamber was evacuated to the vacuum degree of $9.0 \times 10^{-3}$ Pa, and heated to 1160° C. The reached temperature was maintained for 30 minutes. Then, an Ar gas was introduced into the chamber of the sintering furnace. The temperature of the chamber interior (Ar atmosphere) of the sintering furnace was elevated to 1190° C. The reached temperature was maintained for four hours to perform the sintering.

After that, the quality improvement treatment and the solution heat treatment were carried out. As shown in Table 2, the pressure of the Ar atmosphere in the chamber was adjusted to 0.5 MPa. In Example 9, the temperature was maintained at 1175° C. for six hours to perform the quality improvement treatment. Then, the slow cooling was carried out at the cooling rate of 5.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 170° C./minute.

In Example 10, the temperature was maintained at 1130° C. for six hours to perform the quality improvement treatment. Then, the slow cooling was carried out at the cooling rate of 5.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 170° C./minute.

In Example 11, the temperature was maintained at 1165° C. for ten hours to perform the quality improvement treatment. Then, the slow cooling was carried out at the cooling rate of 5.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 170° C./minute.

In Example 12, the temperature was maintained at 1165° C. for two hours to perform the quality improvement treatment. Then, the slow cooling was carried out at the cooling rate of 5.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 170° C./minute.

In Example 13, the temperature was maintained at 1165° C. for six hours to perform the quality improvement treatment. Then, the slow cooling was carried out at the cooling rate of 2.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 170° C./minute.

Subsequently, the sintered body of each Example that had undergone the solution heat treatment was subjected to the aging treatment in a similar manner to Example 8. Thus, a magnet was obtained.

Similar to other Examples, the ICP method was used to confirm (identify) the composition of each magnet. The obtained composition of each magnet is shown in Table 1. Similar to other Examples, the ratio of those crystal grains satisfying d≤10 μm, the ratio of those crystal grains satisfying Δθ≥30 degrees, the squareness ratio, the coercive force, and the residual magnetization were also measured. The measurement results are shown in Table 3.

Example 14

The alloy powder that had the same composition as Example 3 was used as the raw material. Similar to Example 3, the prepared alloy powder was shaped (molded) to a particular form by pressing in a magnetic field to fabricate a compression molded body. Subsequently, the compression molded body of the alloy powder was put in the chamber of the sintering furnace. The interior of the chamber was evacuated to the vacuum degree of $9.0 \times 10^{-3}$ Pa, and heated to 1160° C. The reached temperature was maintained for 30 minutes. Then, an Ar gas was introduced into the chamber of the sintering furnace. The temperature of the chamber interior (Ar atmosphere) of the sintering furnace was elevated to 1190° C. The reached temperature was maintained for four hours to perform the sintering.

After that, the quality improvement treatment was carried out. The pressure of the Ar atmosphere in the chamber was adjusted to 0.2 MPa. In Example 14, as shown in Table 2, the temperature was maintained at 1160° C. for eight hours to perform the quality improvement treatment. Then, the respective steps of the solution heat treatment, the aging treatment and other treatments were carried out in the same manner under the same conditions as Example 3. Thus, a magnet was obtained.

Similar to other Examples, the ICP method was used to confirm (identify) the composition of each magnet. The obtained composition of the magnet is shown in Table 1. Similar to other Examples, the ratio of those crystal grains satisfying d≤10 μm, the ratio of those crystal grains satisfying Δθ≥30 degrees, the squareness ratio, the coercive force, and the residual magnetization were also measured. The measurement results are shown in Table 3.

Example 15

The alloy powder that had the same composition as Example 4 was used as the raw material. Similar to Example 4, the prepared alloy powder was shaped (molded) to a particular form by pressing in a magnetic field to fabricate a compression molded body. Subsequently, the compression molded body of the alloy powder was put in the chamber of the sintering furnace. The interior of the chamber was evacuated to the vacuum degree of $9.0 \times 10^{-3}$ Pa, and heated to 1160° C. The reached temperature was maintained for 30 minutes. Then, an Ar gas was introduced into the chamber of the sintering furnace. The temperature of the chamber interior (Ar atmosphere) of the sintering furnace was elevated to 1190° C. The reached temperature was maintained for four hours to perform the sintering.

After that, the quality improvement treatment was carried out. The pressure of the Ar atmosphere in the chamber was adjusted to 0.5 MPa. In Example 15, as shown in Table 2, the temperature was maintained at 1160° C. for eight hours to perform the quality improvement treatment. Then, the respective steps of the solution heat treatment, the aging treatment and other treatments were carried out in the same manner under the same conditions as Example 4. Thus, a magnet was obtained.

Similar to other Examples, the ICP method was used to confirm (identify) the composition of each magnet. The obtained composition of the magnet is shown in Table 1. Similar to other Examples, the ratio of those crystal grains satisfying d≤10 μm, the ratio of those crystal grains satisfying Δθ≥30 degrees, the squareness ratio, the coercive force, and the residual magnetization were also measured. The measurement results are shown in Table 3.

Example 16

The alloy powder that had the same composition as Example 5 was used as the raw material. Similar to Example 5, the prepared alloy powder was shaped (molded) to a particular form by pressing in a magnetic field to fabricate a compression molded body. Subsequently, the compression molded body of the alloy powder was put in the chamber of the sintering furnace. The interior of the chamber was evacuated to the vacuum degree of $9.0 \times 10^{-3}$ Pa, and heated to 1160° C. The reached temperature was maintained for 30 minutes. Then, an Ar gas was introduced into the chamber of the sintering furnace. The temperature of the chamber interior (Ar atmosphere) of the sintering furnace was elevated to 1190° C. The reached temperature was maintained for four hours to perform the sintering.

After that, the quality improvement treatment was carried out. The pressure of the Ar atmosphere in the chamber was adjusted to 1.1 MPa. In Example 16, as shown in Table 2, the temperature was maintained at 1160° C. for eight hours to perform the quality improvement treatment. Then, the respective steps of the solution heat treatment, the aging treatment and other treatments were carried out in the same manner under the same conditions as Example 5. Thus, a magnet was obtained.

Similar to other Examples, the ICP method was used to confirm (identify) the composition of each magnet. The obtained composition of the magnet is shown in Table 1. Similar to other Examples, the ratio of those crystal grains satisfying d≤10 μm, the ratio of those crystal grains satisfying Δθ≥30 degrees, the squareness ratio, the coercive force, and the residual magnetization were also measured. The measurement results are shown in Table 3.

Comparative Examples 1 and 2

The magnets having the composition as shown in Table 1 were fabricated in the same manner as Examples 1 and 2, respectively. Similar to the Examples, the ratio of those crystal grains satisfying d≤10 μm, the ratio of those crystal grains satisfying Δθ≥30 degrees, the squareness ratio, the coercive force, and the residual magnetization were also measured. The measurement results are shown in Table 3.

Comparative Examples 3 to 7

The alloy powder that had the same composition as Example 8 was used as the raw material. The prepared alloy powder was shaped (molded) to a particular form by pressing in a magnetic field to fabricate a compression molded body. The compression molded body was put in the chamber of the sintering furnace. The interior of the chamber was evacuated to the vacuum degree of $9.0 \times 10^{-3}$ Pa. Then, the sintering was carried out in a similar manner to Example 8.

In Comparative Example 3, as shown in Table 2, the sintered body was cooled to 1120° C. after the sintering. The sintered body was maintained at the reached temperature for twelve hours to perform the solution heat treatment. Then, the cooling was performed until the temperature dropped to room temperature. The cooling rate after the solution heat treatment was 170° C./minute.

In Comparative Example 4, the pressure of the Ar atmosphere in the chamber was adjusted to 0.5 MPa. As shown in Table 2, the temperature was maintained at 1185° C. for six hours to perform the quality improvement treatment. Then, the slow cooling was carried out at the cooling rate of 5.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 170° C./minute.

In Comparative Example 5, the pressure of the Ar atmosphere in the chamber was adjusted to 0.5 MPa. As shown in Table 2, the temperature was maintained at 1125° C. for six hours to perform the quality improvement treatment. Then, the slow cooling was carried out at the cooling rate of 5.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 170° C./minute.

In Comparative Example 6, the pressure of the Ar atmosphere in the chamber was adjusted to 0.5 MPa. As shown in Table 2, the temperature was maintained at 1160° C. for 0.5 hour to perform the quality improvement treatment. Then, the slow cooling was carried out at the cooling rate of 5.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 170° C./minute.

In Comparative Example 7, the pressure of the Ar atmosphere in the chamber was adjusted to 0.5 MPa. As shown in Table 2, the temperature was maintained at 1160° C. for 20 hours to perform the quality improvement treatment. Then, the slow cooling was carried out at the cooling rate of 5.0° C./minute until the temperature dropped to 1120° C. The sintered body was maintained at the reached temperature for twelve hours to carry out the solution heat treatment. Then, the sintered body was cooled to room temperature. The cooling rate after the solution heat treatment was 170° C./minute.

Subsequently, the sintered boy of each Comparative Example, which had undergone the solution heat treatment, was subjected to the aging treatment and other treatments in a similar manner to Example 8. Thus, a magnet was obtained.

Similar to other Examples, the ICP method was used to confirm (identify) the composition of each magnet. The obtained composition of each magnet is shown in Table 1. Similar to other Examples, the ratio of those crystal grains satisfying d≤10 μm, the ratio of those crystal grains satisfying Δθ≥30 degrees, the squareness ratio, the coercive force, and the residual magnetization were also measured. The measurement results are shown in Table 3.

It is obvious from Tables 1 to 3 that the permanent magnets of Examples 1 to 16 have a smaller ratio of crystal grains that have a grain diameter equal to or less than 10 and a smaller ratio of crystal grains that have the crystal orientation perpendicular to the (001) plane of the $Th_2Zn_{17}$ crystal phase in a direction deviated 30 degrees or more relative to the axis of easy magnetization, as compared to, for example, the permanent magnet of Comparative Example 1 that has a high Sm concentration and the permanent magnet of Comparative Example 2 that has a high Zr concentration. Therefore, the permanent magnets of Examples 1 to 16 possess a good squareness ratio, a high coercive force, and high magnetization. These facts indicate that the magnetic property of the permanent magnet is enhanced by adjusting the amounts of the respective elements of the permanent magnet.

The permanent magnets of Examples 8 to 13 have a smaller ratio of crystal grains that have a grain diameter equal to or less than 10 μm and a smaller ratio of crystal grains that have the crystal orientation perpendicular to the (001) plane of the $Th_2Zn_{17}$ crystal phase in a direction deviated 30 degrees or more relative to the axis of easy magnetization, as compared to, for example, the permanent magnet of Comparative Example 3 that is not subjected to the quality improvement treatment. Therefore, the permanent magnets of Examples 8 to 13 have a good squareness ratio, a high coercive force, and high magnetization. These facts indicate that the magnetic property of the permanent magnet is enhanced by applying the quality improvement treatment.

The permanent magnets of Examples 8 to 13 have a smaller ratio of crystal grains that have a grain diameter equal to or less than 10 μm and a smaller ratio of crystal grains that have the crystal orientation perpendicular to the (001) plane of the $Th_2Zn_{17}$ crystal phase in a direction deviated 30 degrees or more relative to the axis of easy magnetization, as compared to, for example, the permanent magnets of Comparative Examples 4 and 5 with the holding temperature between the sintering and the quality improvement treatment being lower than 10° C. Therefore, the permanent magnets of Examples 8 to 13 have a good squareness ratio, a high coercive force, and high magnetization. These facts indicate that the magnetic property of the permanent magnet is enhanced by controlling the holding temperature in the quality improvement treatment.

The permanent magnets of Examples 8 to 13 have a smaller ratio of crystal grains that have a grain diameter equal to or less than 10 μm and a smaller ratio of crystal grains that have the crystal orientation perpendicular to the (001) plane of the $Th_2Zn_{17}$ crystal phase in a direction deviated 30 degrees or more relative to the axis of easy magnetization, as compared to, for example, the permanent magnet of Comparative Example 6 that is subjected to the quality improvement treatment with the holding time being 0.5 hour and the permanent magnet of Comparative Example 7 that is subjected to the quality improvement treatment with the holding time being 20 hours. Therefore, the permanent magnets of Examples 8 to 13 have a good squareness ratio, a high coercive force, and high magnetization. These facts indicate that the magnetic property of the permanent magnet is enhanced by controlling the holding temperature in the quality improvement treatment.

As described above, the permanent magnets of Examples 1 to 16 have the regulated ratio of crystal grains that have a grain diameter equal to or less than 10 μm in the main phase and also a regulated ratio of crystal grains that have the crystal orientation perpendicular to the (001) plane of the $Th_2Zn_{17}$ crystal phase in a direction deviated 30 degrees or more relative to the axis of easy magnetization in the main phase. Therefore, any of these permanent magnets can demonstrate a good squareness ratio, a high coercive force and high magnetization even if the Fe concentration is equal to or greater than 25%. It is therefore understood that the permanent magnets of Examples 1 to 16 have the improved magnetic property.

TABLE 1

Magnet Composition (Atomic Ratio)
(Others Example 1: Nd, 2: Ti, 3: Mn, 4: Cr 5: Al__0.0115 + Cr__0.015, Comparative Example 1: Cr, 2: Ti)

| | Sm | Co | Fe | Cu | Zr | Others |
|---|---|---|---|---|---|---|
| Example 1 | 10.89 | 55.16 | 25.33 | 5.29 | 3.11 | 0.22 |
| Example 2 | 12.12 | 53.98 | 26.36 | 5.71 | 1.61 | 0.22 |
| Example 3 | 10.81 | 52.98 | 29.61 | 4.91 | 1.47 | 0.22 |
| Example 4 | 11.24 | 52.99 | 29.74 | 4.13 | 1.78 | 0.12 |
| Example 5 | 11.11 | 48.59 | 28.89 | 9.78 | 1.51 | 0.12 |
| Example 6 | 11.24 | 50.50 | 31.51 | 5.15 | 1.60 | 0.00 |
| Example 7 | 11.43 | 48.01 | 33.83 | 5.31 | 1.42 | 0.00 |
| Example 8 | 11.24 | 50.76 | 31.07 | 5.33 | 1.60 | 0.00 |
| Example 9 | 11.24 | 50.76 | 31.07 | 5.33 | 1.60 | 0.00 |
| Example 10 | 11.24 | 50.76 | 31.07 | 5.33 | 1.60 | 0.00 |
| Example 11 | 11.24 | 50.76 | 31.07 | 5.33 | 1.60 | 0.00 |
| Example 12 | 11.24 | 50.76 | 31.07 | 5.33 | 1.60 | 0.00 |
| Example 13 | 11.24 | 50.76 | 31.07 | 5.33 | 1.60 | 0.00 |
| Example 14 | 10.81 | 52.98 | 29.61 | 4.91 | 1.47 | 0.22 |
| Example 15 | 11.24 | 52.99 | 29.74 | 4.13 | 1.78 | 0.12 |
| Example 16 | 11.11 | 48.59 | 28.89 | 9.78 | 1.51 | 0.12 |
| Comparative Example 1 | 12.89 | 53.89 | 24.75 | 5.17 | 3.04 | 0.26 |
| Comparative Example 2 | 12.12 | 51.45 | 26.36 | 5.71 | 4.14 | 0.22 |
| Comparative Example 3 | 11.24 | 50.76 | 31.07 | 5.33 | 1.60 | 0.00 |
| Comparative Example 4 | 11.24 | 50.76 | 31.07 | 5.33 | 1.60 | 0.00 |
| Comparative Example 5 | 11.24 | 50.76 | 31.07 | 5.33 | 1.60 | 0.00 |
| Comparative Example 6 | 11.24 | 50.76 | 31.07 | 5.33 | 1.60 | 0.00 |
| Comparative Example 7 | 11.24 | 50.76 | 31.07 | 5.33 | 1.60 | 0.00 |

TABLE 2

| | Holding Temperature of Sintering (° C.) | Holding Temperature of Quality Improvement Treatment (° C.) | Holding Time of Quality Improvement Treatment (hours) | Holding Temperature of Solution heat treatment (° C.) |
|---|---|---|---|---|
| Example 1 | 1210 | 1190 | 6 | 1165 |
| Example 2 | 1210 | 1190 | 6 | 1165 |
| Example 3 | 1195 | 1160 | 2 | 1140 |
| Example 4 | 1195 | 1160 | 2 | 1140 |
| Example 5 | 1195 | 1160 | 2 | 1140 |
| Example 6 | 1180 | 1160 | 10 | 1120 |
| Example 7 | 1180 | 1160 | 10 | 1120 |
| Example 8 | 1190 | 1165 | 6 | 1120 |
| Example 9 | 1190 | 1175 | 6 | 1120 |
| Example 10 | 1190 | 1130 | 6 | 1120 |
| Example 11 | 1190 | 1165 | 10 | 1120 |
| Example 12 | 1190 | 1165 | 2 | 1120 |
| Example 13 | 1190 | 1165 | 6 | 1120 |
| Example 14 | 1190 | 1160 | 8 | 1140 |
| Example 15 | 1190 | 1160 | 8 | 1140 |
| Example 16 | 1190 | 1160 | 8 | 1140 |
| Comparative Example 1 | 1210 | 1190 | 6 | 1165 |
| Comparative Example 2 | 1210 | 1190 | 6 | 1165 |
| Comparative Example 3 | 1190 | — | — | 1120 |
| Comparative Example 4 | 1190 | 1185 | 6 | 1120 |
| Comparative Example 5 | 1190 | 1125 | 6 | 1120 |
| Comparative Example 6 | 1190 | 1160 | 0.5 | 1120 |
| Comparative Example 7 | 1190 | 1160 | 20 | 1120 |

TABLE 3

| | Percentage of Crystal Grains with d ≤ 10 μm [%] | Percentage of Crystal Grains with Δθ ≥ 30° [%] | Crystal Grain Average Diameter (μm) | Squareness Ratio (%) | Coercive Force (kA/m) | Residual Magnetization (T) |
|---|---|---|---|---|---|---|
| Example 1 | 3.2 | 28.0 | 64.2 | 95.5 | 1820 | 1.170 |
| Example 2 | 4.3 | 24.0 | 60.8 | 95.2 | 1770 | 1.190 |
| Example 3 | 2.2 | 20.0 | 44.0 | 92.0 | 1550 | 1.220 |
| Example 4 | 3.0 | 22.0 | 56.2 | 91.5 | 1630 | 1.220 |
| Example 5 | 2.1 | 18.0 | 48.1 | 92.3 | 1600 | 1.240 |
| Example 6 | 3.5 | 31.0 | 41.5 | 94.0 | 1530 | 1.245 |
| Example 7 | 3.2 | 34.0 | 58.4 | 93.6 | 1490 | 1.260 |
| Example 8 | 2.5 | 24.0 | 53.7 | 94.0 | 1640 | 1.240 |
| Example 9 | 3.4 | 36.0 | 59.2 | 93.2 | 1570 | 1.240 |

TABLE 3-continued

|  | Percentage of Crystal Grains with d ≤ 10 μm [%] | Percentage of Crystal Grains with Δθ ≥ 30° [%] | Crystal Grain Average Diameter (μm) | Squareness Ratio (%) | Coercive Force (kA/m) | Residual Magnetization (T) |
| --- | --- | --- | --- | --- | --- | --- |
| Example 10 | 1.8 | 19.0 | 52.5 | 92.5 | 1540 | 1.240 |
| Example 11 | 2.7 | 26.0 | 69.5 | 95.2 | 1720 | 1.240 |
| Example 12 | 2.3 | 22.0 | 49.1 | 92.2 | 1550 | 1.240 |
| Example 13 | 2.8 | 25.0 | 66.2 | 94.7 | 1760 | 1.240 |
| Example 14 | 2.4 | 18.0 | 69.3 | 94.1 | 1670 | 1.220 |
| Example 15 | 3.4 | 24.0 | 74.5 | 93.4 | 1700 | 1.220 |
| Example 16 | 2.2 | 19.0 | 55.5 | 94.2 | 1650 | 1.240 |
| Comparative Example 1 | 5.8 | 38.0 | 33.0 | 63.2 | 260 | 1.150 |
| Comparative Example 2 | 7.4 | 43.0 | 29.2 | 67.7 | 420 | 1.170 |
| Comparative Example 3 | 6.8 | 46.0 | 33.9 | 84.0 | 1320 | 1.230 |
| Comparative Example 4 | 8.8 | 48.0 | 34.8 | 88.0 | 1460 | 1.210 |
| Comparative Example 5 | 5.3 | 43.0 | 29.6 | 87.2 | 1390 | 1.220 |
| Comparative Example 6 | 5.6 | 42.0 | 34.1 | 84.7 | 1470 | 1.220 |
| Comparative Example 7 | 7.9 | 44.0 | 34.6 | 72.3 | 950 | 1.180 |

What is claimed is:

1. A permanent magnet comprising:

a composition expressed by a composition formula $R_p Fe_q M_r Cu_t Co_{100-p-q-r-t}$, where R is at least one element selected from the group consisting of rare earth elements, M is at least one element selected from the group consisting of Zr, Ti, and Hf, p is a number satisfying 10.8≤p≤12.5 atomic percent, q is a number satisfying 25≤q≤40 atomic percent, r is a number satisfying 0.88≤r≤4.3 atomic percent, and t is a number satisfying 3.5≤t≤13.5 atomic percent; and a metallic structure including a main phase having a $Th_2Zn_{17}$ crystal phase, the main phase having crystal grains, 5% or less of the crystal grains having a grain diameter equal to or smaller than 10 μm, 40% or less of the crystal grains having a crystal orientation perpendicular to a (001) plane of the $Th_2Zn_{17}$ crystal phase in a direction deviated 30 degrees or more relative to an axis of easy magnetization.

2. The magnet of claim 1, wherein an average grain diameter of the crystal grains of the main phase is equal to or greater than 35 μm.

3. The magnet of claim 1, wherein the metallic structure includes a Cu-M rich phase having a higher Cu concentration and a higher M concentration than the main phase.

4. The magnet of claim 3, wherein the metallic structure includes a grain boundary phase disposed between the crystal grains of the main phase, and the grain boundary phase has the Cu-M rich phase.

5. The magnet of claim 3, wherein the Cu-M rich phase has a composition expressed by a composition formula $R_{p1} Fe_{q1} M_{r1} Cu_{t1} C_{100-p1-q1-r1-t1}$, where p1 is a number satisfying 8≤p1≤20 atomic percent, q1 is a number satisfying 15≤q1≤35 atomic percent, r1 is a number satisfying 2<r1≤15 atomic percent, and t1 is a number satisfying 5≤t1≤25 atomic percent.

6. The magnet of claim 1, wherein the main phase has a cell phase having the $Th_2Zn_{17}$ crystal phase, and a Cu rich phase having a higher Cu concentration than the cell phase.

7. The magnet of claim 1, wherein 50 atomic percent or more of the R element in the composition formula is Sm, and 50 atomic percent or more of the M element in the composition formula is Zr.

8. A motor comprising a permanent magnet recited in claim 1.

9. A generator comprising a permanent magnet recited in claim 1.

* * * * *